(12) United States Patent
Harale et al.

(10) Patent No.: US 11,572,517 B2
(45) Date of Patent: *Feb. 7, 2023

(54) PROCESSING FACILITY TO PRODUCE HYDROGEN AND PETROCHEMICALS

(71) Applicant: Saudi Arabian Oil Company, Dhahran (SA)

(72) Inventors: Aadesh Harale, Dhahran (SA); Ibrahim Abba, Dhahran (SA); Aqil Jamal, Dhahran (SA); Abdennour Bourane, Ras Tanura (SA); Mourad Younes, Dhahran (SA); Alberto Lozano Ballesteros, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 360 days.

This patent is subject to a terminal disclaimer.

(21) Appl. No.: 16/701,796

(22) Filed: Dec. 3, 2019

(65) Prior Publication Data

US 2021/0163833 A1 Jun. 3, 2021

(51) Int. Cl.
*C10G 69/08* (2006.01)
*B01D 3/06* (2006.01)
(Continued)

(52) U.S. Cl.
CPC .............. *C10G 69/08* (2013.01); *B01D 3/06* (2013.01); *B01D 19/0057* (2013.01);
(Continued)

(58) Field of Classification Search
CPC .............. C10G 69/08; C10G 2400/06; C10G 2400/20; C10G 2400/30; C10G 2/30;
(Continued)

(56) References Cited

U.S. PATENT DOCUMENTS

| | | |
|---|---|---|
| 978,576 A | 12/1910 | Goodell |
| 2,614,066 A | 10/1952 | Cornell |
| 2,910,426 A | 10/1959 | Gluesenkamp |
| 3,409,540 A | 11/1968 | Gould et al. |
| 3,533,938 A | 10/1970 | Leas Arnold |
| 3,702,292 A | 11/1972 | Burich |

(Continued)

FOREIGN PATENT DOCUMENTS

| | | |
|---|---|---|
| CA | 2938299 | 5/2015 |
| EP | 0130933 | 9/1987 |

(Continued)

OTHER PUBLICATIONS

Amo et al., "Low-Quality Natural Gas Sulfur Removal/Recovery," Membrane Technology and Research. DOE Report DE-AC21-97MC28133—01, Jan. 29, 1998. 107 pages.

(Continued)

*Primary Examiner* — Steven J Bos
*Assistant Examiner* — Syed T Iqbal
(74) *Attorney, Agent, or Firm* — Fish & Richardson P.C.

(57) ABSTRACT

A processing facility is provided that includes a feedstock separation system configured to separate a feed stream into a lights stream and a heavies stream, a hydrogen production system configured to produce hydrogen and carbon dioxide from the lights stream, and a carbon dioxide conversion system configured to produce synthetic hydrocarbons or the carbon dioxide. The processing facility also includes a hydroprocessing system configured to process the heavies stream, and a hydroprocessor separation system configured to separate a hydroprocessing system effluent into a separator tops stream and a separator bottoms stream, wherein the separator bottoms stream is fed to the hydrogen production system.

37 Claims, 6 Drawing Sheets

(51) Int. Cl.
    *B01D 19/00* (2006.01)
    *B01D 53/047* (2006.01)
    *B01J 7/00* (2006.01)
    *B01J 19/24* (2006.01)
    *C01B 3/02* (2006.01)
    *C01B 3/34* (2006.01)
    *C01B 3/56* (2006.01)

(52) U.S. Cl.
    CPC .............. *B01D 53/047* (2013.01); *B01J 7/00* (2013.01); *B01J 19/245* (2013.01); *C01B 3/02* (2013.01); *C01B 3/34* (2013.01); *C01B 3/56* (2013.01); *C01B 2203/0233* (2013.01); *C01B 2203/042* (2013.01); *C01B 2203/065* (2013.01); *C01B 2203/1235* (2013.01); *C10G 2400/06* (2013.01); *C10G 2400/20* (2013.01); *C10G 2400/30* (2013.01)

(58) Field of Classification Search
    CPC .......... C10G 9/36; C10G 21/00; C10G 35/00; C10G 55/02; C10G 57/00; C10G 47/00; C10G 67/16; C10G 45/00; B01D 3/06; B01D 19/0057; B01D 53/047; B01D 2256/16; B01D 2256/22; B01D 2257/7025; B01D 53/0423; B01J 7/00; B01J 19/245; C01B 3/02; C01B 3/34; C01B 3/56; C01B 2203/0233; C01B 2203/042; C01B 2203/065; C01B 2203/1235; C01B 3/48; C01B 2203/025; C01B 2203/0283; C01B 2203/041; C01B 2203/043; C01B 2203/062; C01B 3/38; C01B 3/50; Y02C 20/20; Y02P 20/156; Y02P 30/40
    See application file for complete search history.

(56) References Cited

U.S. PATENT DOCUMENTS

| | | |
|---|---|---|
| 3,726,789 A | 4/1973 | Kovach |
| 3,755,143 A | 8/1973 | Hosoi et al. |
| 3,856,659 A | 12/1974 | Owen |
| 3,979,757 A | 9/1976 | Kilby et al. |
| 4,090,949 A | 5/1978 | Owen et al. |
| 4,134,824 A | 1/1979 | Kamm et al. |
| 4,264,435 A | 4/1981 | Read, Jr. et al. |
| 4,297,203 A | 10/1981 | Ford et al. |
| 4,426,276 A | 1/1984 | Dean et al. |
| 4,466,946 A | 8/1984 | Goddin, Jr. et al. |
| 4,527,003 A | 7/1985 | Okamoto et al. |
| 4,587,011 A | 5/1986 | Okamoto et al. |
| 4,589,896 A | 5/1986 | Chen et al. |
| 4,655,904 A | 4/1987 | Okamoto et al. |
| 4,717,407 A | 1/1988 | Choe et al. |
| 4,725,349 A | 2/1988 | Okamoto et al. |
| 4,786,400 A | 11/1988 | Farnsworth |
| 4,830,728 A | 5/1989 | Herbst et al. |
| 4,992,160 A | 2/1991 | Long et al. |
| 5,091,351 A | 2/1992 | Murakawa et al. |
| 5,108,581 A | 4/1992 | Aldridge |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,837,032 A | 11/1998 | Moll et al. |
| 5,904,837 A | 5/1999 | Fujiyama |
| 5,906,728 A | 5/1999 | Iaccino et al. |
| 5,951,850 A | 9/1999 | Ino et al. |
| 6,033,555 A | 3/2000 | Chen et al. |
| 6,179,900 B1 | 1/2001 | Behling et al. |
| 6,190,533 B1 | 2/2001 | Bradow et al. |
| 6,210,562 B1 | 3/2001 | Xie et al. |
| 6,274,032 B2 | 8/2001 | Hood et al. |
| 6,293,979 B1 | 9/2001 | Choudhary et al. |
| 6,361,582 B1 | 3/2002 | Pinnau et al. |
| 6,531,515 B2 | 3/2003 | Moore, Jr. et al. |
| 6,656,346 B2 | 12/2003 | Ino et al. |
| 6,743,961 B2 | 6/2004 | Powers |
| 6,896,717 B2 | 5/2005 | Pinnau et al. |
| 6,979,757 B2 | 12/2005 | Powers |
| 7,019,187 B2 | 3/2006 | Powers |
| 7,045,554 B2 | 5/2006 | Raje |
| 7,132,042 B2 | 11/2006 | Genetti et al. |
| 7,374,664 B2 | 5/2008 | Powers |
| 7,396,449 B2 | 7/2008 | Powers |
| 7,404,889 B1 | 7/2008 | Powers |
| 7,419,584 B2 | 9/2008 | Stell et al. |
| 7,550,642 B2 | 6/2009 | Powers |
| 7,642,292 B2 | 1/2010 | Severinsky |
| 7,744,747 B2 | 6/2010 | Halsey |
| 7,858,834 B2 | 12/2010 | Powers |
| 7,972,498 B2 | 7/2011 | Buchanan et al. |
| 7,973,087 B2 | 7/2011 | Kibby et al. |
| 8,198,338 B2 | 6/2012 | Shulenberger et al. |
| 8,828,121 B1 | 9/2014 | He et al. |
| 9,067,850 B2 | 6/2015 | Abbott et al. |
| 9,085,497 B2 | 7/2015 | Jennings |
| 9,096,806 B2 | 8/2015 | Abba et al. |
| 9,242,230 B2 | 1/2016 | Moon et al. |
| 9,255,230 B2 | 2/2016 | Shafi et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,328,035 B1 | 5/2016 | Kuhn et al. |
| 9,752,080 B2 | 9/2017 | Christensen et al. |
| 10,357,759 B2 | 7/2019 | D'Souza et al. |
| 2003/0129109 A1 | 7/2003 | Bronicki |
| 2005/0211603 A1 | 9/2005 | Guillaume et al. |
| 2005/0217479 A1 | 10/2005 | Hale et al. |
| 2008/0001645 A1 | 1/2008 | Kuroki |
| 2008/0011644 A1 | 1/2008 | Dean et al. |
| 2008/0011645 A1 | 1/2008 | Dean |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2009/0261017 A1* | 10/2009 | Iqbal ..................... C10K 1/024 208/128 |
| 2010/0089795 A1 | 4/2010 | Fujiyama et al. |
| 2010/0137458 A1 | 6/2010 | Erling |
| 2011/0083996 A1 | 4/2011 | Shafi et al. |
| 2011/0247500 A1 | 10/2011 | Akhras et al. |
| 2012/0111051 A1 | 5/2012 | Kulkarni et al. |
| 2012/0168154 A1 | 7/2012 | Chinn et al. |
| 2012/0323059 A1 | 12/2012 | Liu et al. |
| 2013/0087482 A1* | 4/2013 | Haizmann ............ C10G 35/095 208/64 |
| 2013/0129610 A1 | 5/2013 | Kale |
| 2013/0220884 A1 | 8/2013 | Bourane et al. |
| 2013/0233766 A1 | 9/2013 | Shafi et al. |
| 2013/0248419 A1 | 9/2013 | Abba |
| 2015/0166430 A1* | 6/2015 | Keusenkothen ....... C10G 47/02 526/75 |
| 2015/0240717 A1 | 8/2015 | Starcher et al. |
| 2015/0290575 A1 | 10/2015 | Rothermel et al. |
| 2016/0264886 A1 | 9/2016 | Davydov |
| 2017/0050845 A1 | 2/2017 | Lofberg et al. |
| 2017/0058214 A1* | 3/2017 | Oprins ................... C10G 69/06 |
| 2018/0066197 A1 | 3/2018 | Koseoglu et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1* | 7/2018 | Abudawoud .......... C10G 69/10 |
| 2018/0312767 A1 | 11/2018 | Al-Sayed et al. |
| 2018/0333704 A1* | 11/2018 | Ide ........................... B01J 35/04 |
| 2019/0112535 A1 | 4/2019 | Kinzl et al. |

FOREIGN PATENT DOCUMENTS

| | | |
|---|---|---|
| EP | 684066 | 11/1995 |
| EP | 0909804 | 9/2010 |

(56) References Cited

FOREIGN PATENT DOCUMENTS

| WO | WO 2000009633 | 2/2000 |
| WO | WO 2009073436 | 6/2009 |
| WO | WO 2010009077 | 1/2010 |
| WO | WO 2010009082 | 1/2010 |
| WO | WO 2010009089 | 1/2010 |
| WO | WO 2010143783 | 12/2010 |
| WO | WO 2015128045 | 9/2013 |
| WO | WO 2015128018 | 9/2015 |
| WO | WO 2015183200 | 12/2015 |
| WO | WO 2016207892 | 12/2016 |
| WO | WO 2018226617 | 12/2018 |

OTHER PUBLICATIONS

Aschoundong et al., "Silane Modification of Cellulose Acetate Dense Films as Materials for Acid Gas Removal Macromolecules," Macromolecules, vol. 46, No. 14, Jul. 9, 2013, 11 pages.

Belov et al., "Gas transport and free volume in hexafluoropropylene polymers," Journal of Membrane Science, vol. 383, Nov. 2011, 8 pages.

Bernardo et al., "Gas transport properties of Pebax/room temperature ionic liquid gel membranes" Separation and Purification Technology vol. 97, Sep. 2012, 13 pages.

Bhide et al., "Hybrid processes for the removal of acid gases from natural gas," Journal of Membrane Science. vol. 140, Issue 1, Mar. 4, 1998, 2 pages, Abstract Only.

Chatterjee et al., "Poly(ether urethane) and poly(ether urethane urea) membranes with high $H_2S/CH_4$ selectivity," Journal of Membrane Science, vol. 135, No. 99, Nov. 1997, 8 pages.

Jansen et al.. "On the unusual solvent and the effect on the gas transport in perfluorinated Hyflon AD Membranes," Journal of Membrane Science, vol. 287, Issue 1, Jan. 2007, 6 pages.

Kraftschik et al.. "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing. Operations & Maintenance, Jan. 7, 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al.. "Solutions for tire treatment of highly sour eases." Digital Refinding: Processing, Operations & Maintenance, Apr. 2012, 14 pages.

Lockhart, "Sour oil and gas management: 3.3," vol. Lii/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346, Jan. 7 2010, 10 pages.

Merkel and Toy, "Comparison of Hydrogen Sulfide Transport Properties in Fluorinated and Nonfluorinated Polymers," Macromolecules, vol. 39, No. 22, Sep. 2006, 10 pages.

Robeson, "The upper bound revisited," Journal of Membrane Science, vol. 320, Jul. 15, 2008, 11 pages.

Rufford et al., "The removal of CO2 and N2 from natural gas: A review of conventional and emerging process technologies," Journal of Petroleum Science and Engineering, vol. 94-95, Sep. 2012, 32 pages.

PCT International Search Report and Written Opinion in International Appln. No. PCT/US2020/062728, dated Mar. 19, 2021, 14 pages.

* cited by examiner

PROCESSING FACILITY TO PRODUCE HYDROGEN AND PETROCHEMICALS

BACKGROUND

Olefins, such as ethylene, propylene, butylene, and butane, and aromatics, such as benzene, toluene, and xylene, are basic intermediates that are widely used in the petrochemical and chemical industries. Steam cracking and reforming are used to form olefins and aromatics from feedstocks such as petroleum gases and distillates such as naphtha, kerosene, and gas oil.

SUMMARY

An embodiment described in examples herein provides a processing facility. The processing facility includes a feedstock separation system configured to separate a feed stream into a lights stream and a heavies stream, a hydrogen production system configured to produce hydrogen and carbon dioxide from the lights stream, and a carbon dioxide conversion system configured to produce synthetic hydrocarbons or the carbon dioxide. The processing facility also includes a hydroprocessing system configured to process the heavies stream, and a hydroprocessor separation system configured to separate a hydroprocessing system effluent into a separator tops stream and a separator bottoms stream, wherein the separator bottoms stream is fed to the hydrogen production system.

Another embodiment described in examples herein provides a method. The method includes separating a feedstock stream into a light fraction and a heavy fraction, processing the light fraction in a hydrogen production system to form hydrogen and carbon dioxide, processing the heavy fraction in a hydroprocessing system. A hydroprocessed effluent from the hydroprocessing system is separated into a separator tops stream and a separator bottoms stream. The separator tops stream are processed in a reformer, and the separator bottoms stream is fed to the hydrogen production system.

DETAILED DESCRIPTION

An integrated hydrotreating and cracking process is provided in examples described herein. In the process, crude oil or condensates are directly converted to hydrogen and petrochemicals, including olefinic petrochemicals, such as ethylene, propylene, butylene, and butenes, and aromatic petrochemicals, such as benzene, toluene, and xylene. In the process, a feedstock stream is split into a light fraction, or lights stream, and a heavy fraction, or heavies stream. The light fraction, composed mostly of material in a naphtha boiling temperature range, is processed to produce hydrogen. The heavy fraction, composed mostly of material in a diesel plus boiling temperature range, may be cracked to produce various chemicals or petrochemical feedstocks. In one embodiment, the heavy fraction is cracked in a catalytic cracker. In another embodiment, the light fraction is processed in a steam reformer to enhance the production of aromatics.

The term crude oil as used here refers to whole crude oil from conventional sources, including crude oil that has undergone some pre-treatment. Crude oil can refer to material that has been subjected to one or more of water-oil separation, gas-oil separation, desalting, and stabilization. As used herein, light fraction material boiling temperature range may have a boiling point below about 370° C. Heavy fraction material boiling temperature range may have a boiling point of greater than about 180° C.

Figure 1:
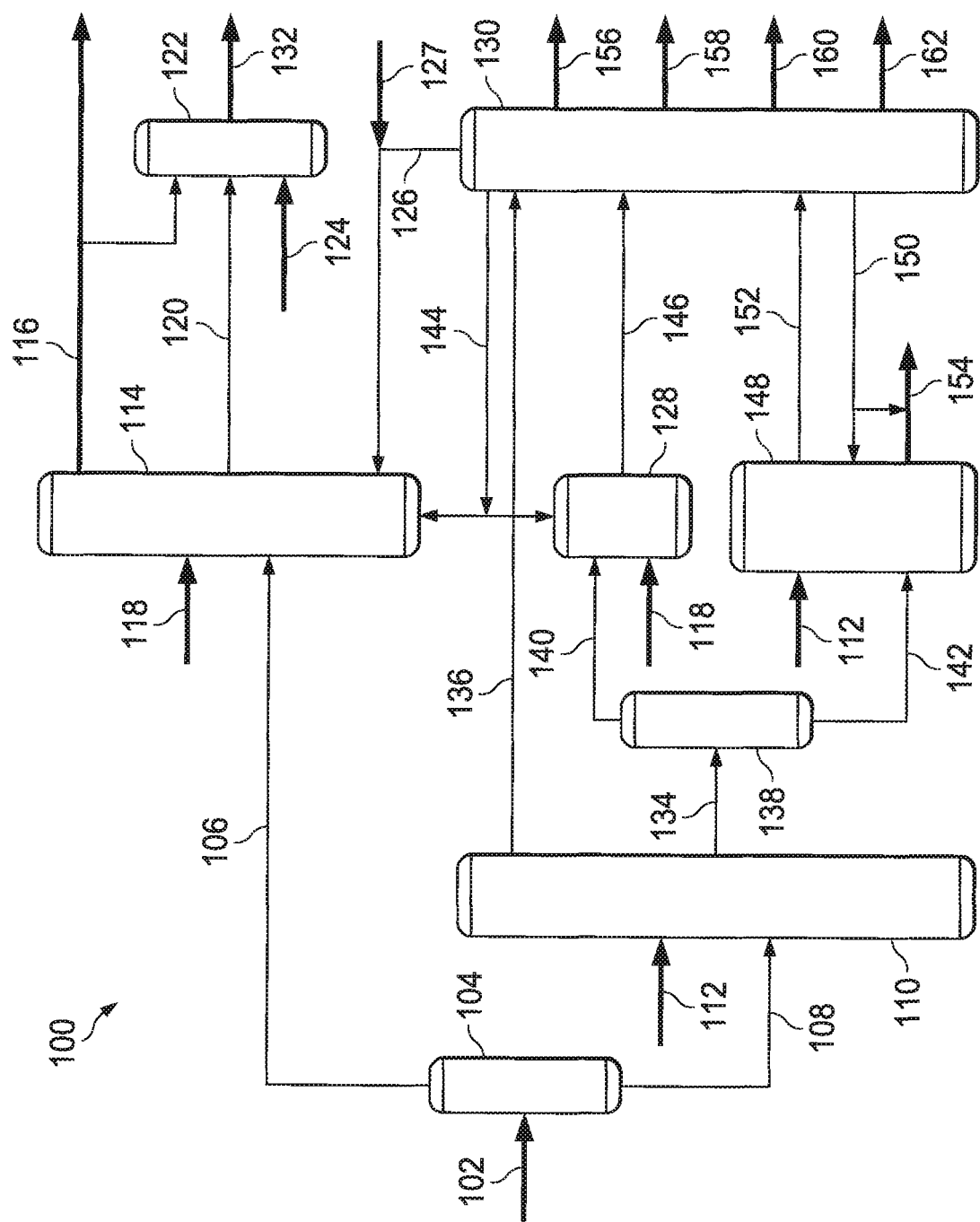
FIG. 1 is an example of a processing facility that directly converts crude oil into petrochemicals, including both olefinic and aromatic petrochemicals.

FIG. 1 is an example of a processing facility 100 that directly converts crude oil into petrochemicals, including both olefinic and aromatic petrochemicals. Inputs to and outputs from the processing facility are shown as thicker lines. A feedstock stream 102 of crude oil or condensate, is received into a feedstock separation system 104 of the processing facility 100. The feedstock separation system 104 separates the feedstock stream 102 into a light fraction or lights stream 106, such as a gas, and a heavy fraction or heavies stream 108, such as a liquid. In some embodiments, the lights stream 106 can be a naphtha fraction. In some embodiments, the lights stream 106 can have a boiling point below about 180° C., below about 220° C., or below about 370° C. In some embodiments, the heavies stream 108 can have a boiling point above about 180° C., above about 220° C., or above about 370° C.

In some examples, the feedstock separation system 104 can be a flash separation device such as a flash drum. For instance, the feedstock separation system 104 can be a single stage separation device such as a flash separator with a cut point between about 150° C. and about 400° C. In various embodiments, the cut point is about 180° C., about 220° C., or about 370° C. In some embodiments, the feedstock separation system 104 can operate in the absence of a flash zone. For instance, the feedstock separation system 104 can include a cyclonic type of separation device, a splitter, or another type of separation device based on physical or mechanical separation of vapors and liquids. In a cyclonic separation device, vapor and liquid flow into the device through a cyclonic geometry. The vapor is swirled in a circular pattern to create forces that cause heavier droplets and liquid to be captured and channeled to a liquid outlet. Vapor is channeled to a vapor outlet. The cyclonic separation device operates isothermally and with very low residence time. The cut point of the feedstock separation system 104 can be adjusted based on factors such as the vaporization temperature, the fluid velocity of the material entering the feedstock separation system 104, or both, or other factors. Further description of separation devices can be found in U.S. Pat. No. 8,337,603, the contents of which are incorporated here by reference in their entirety.

The heavies stream 108 is routed to a hydroprocessing system 110 for processing by the removal of impurities, such as sulfur, metals, nitrogen, or other impurities. In some embodiments, the hydroprocessing system 110 performs a hydrocracking function to form additional products from the heavies stream 108.

As used herein, a system is an integrated group of processing equipment configured to perform a particular function, such as separations, hydroprocessing, hydrogen production, and the like. Further, some systems may include vessels to perform multiple functions. For example, a hydroprocessing system may include separation vessels to separate products into multiple streams. A system may include a single vessel, or multiple vessels, and all associated catalysts, pumps, valves, compressors, and process equipment used to perform the designated function.

For example, the hydroprocessing system may include a single hydroprocessing vessel with a single catalyst zone or multiple catalyst zones. In other examples, the hydroprocessing system may include multiple vessels, multiple zones, or both, wherein each reactor or zone may use different catalysts and conditions to perform different functions, such as hydrodesulfurization, hydrodemetallation, hydrocracking, and the like. The hydroprocessing system 110 is discussed further herein. A hydrogen stream 112 is provided to the hydroprocessing system 110.

In some examples, selective hydroprocessing or hydrotreating processes can increase the paraffin content or decrease the viscosity as measured by the Bureau of Mines Correlation Index (BMCI) of a feedstock. For example, the heavies stream 108 separated from the feedstock stream 102 may be improved by hydrotreating to saturate multiple carbon-carbon bonds followed by mild hydrocracking of aromatics, especially polyaromatics. When hydrotreating a crude oil contaminants, such as metals, sulfur and nitrogen can be removed by passing the feedstock through a series of layered catalysts that perform the catalytic functions of one or more of demetallization, desulfurization, and denitrogenation. In some examples, the sequence of catalysts to perform hydrodemetallization (HDM) and hydrodesulfurization (HDS) can include a hydrodemetallization catalyst, an intermediate catalyst, a hydrodesulfurization catalyst, and a final catalyst.

The catalyst in the HDM section can be based on a gamma alumina support, with a surface area of between about 140 $m^2/g$ and about 240 $m^2/g$. This catalyst has a very high pore volume, such as a pore volume in excess of about 1 $cm^3/g$. The pore size can be predominantly macroporous, which provides a large capacity for the uptake of metals on the surface of the catalyst and optionally dopants. The active metals on the catalyst surface can be sulfides of nickel (Ni), molybdenum (Mo), or both, with a molar ratio of Ni:(Ni+Mo) of less than about 0.15. The concentration of nickel is lower on the HDM catalyst than other catalysts as some nickel and vanadium is anticipated to be deposited from the feedstock itself, thus acting as a catalyst. The dopant can be one or more of phosphorus, boron, silicon, and halogens, for instance, as described in U.S. Patent Publication Number US 2005/0211603, the contents of which are incorporated by reference herein their entirety. In some examples, the catalyst can be in the form of alumina extrudates or alumina beads. For instance, alumina beads can be used to facilitate unloading of the catalyst HDM beds in the reactor as the metal uptake can range between from 30 to 100% at the top of the bed.

An intermediate catalyst can be used to perform a transition between the hydrodemetallization and hydrodesulfurization functions. The intermediate catalyst can have intermediate metal loadings and pore size distribution. The catalyst in the HDM/HDS reactor can be an alumina based support in the form of extrudates, at least one catalytic metal from group VI (for instance, molybdenum, tungsten, or both), or at least one catalytic metals from group VIII (for instance, nickel, cobalt, or both), or a combination of any two or more of them. The catalyst can contain at least one dopant, such as one or more of boron, phosphorous, halogens, and silicon. The intermediate catalyst can have a surface area of between about 140 $m^2/g$ and about 200 $m^2/g$, a pore volume of at least about 0.6 $cm^3/g$, and mesoporous pores sized between about 12 nm and about 50 nm.

The catalyst in the HDS section can include gamma alumina based support materials with a surface area towards the higher end of the HDM range, such as between about 180 $m^2/g$ and about 240 $m^2/g$. The higher surface for the HDS catalyst results in relatively smaller pore volume, such as a pore volume of less than about 1 $cm^3/g$. The catalyst contains at least one element from group VI, such as molybdenum, and at least one element from group VIII, such as nickel. The catalyst also contains at least one dopant, such as one or more of boron, phosphorous, silicon, and halogens. In some examples, cobalt (Co) can be used to provide relatively higher levels of desulfurization. The metals loading for the active phase is higher as the desired activity is higher, such that the molar ratio of Ni:(Ni+Mo) is between about 0.1 and about 0.3 and the molar ratio of (Co+Ni):Mo is between about 0.25 and about 0.85.

A final catalyst can perform hydrogenation of the feedstock rather than having a primary function of hydrodesulfurization. In some examples, the final catalyst can replace the intermediate catalyst and the catalyst in the HDS section. The final catalyst can be promoted by nickel and the support can be wide pore gamma alumina. The final catalyst can have a surface area towards the higher end of the HDM range, such as between about 180 $m^2/g$ and about 240 $m^2/g$. The higher surface area for the final catalyst results in relatively smaller pore volume, such as a pore volume of less than about 1 $cm^3/g$.

In some configurations of the processing facility 100, such as that shown in FIG. 1, the lights stream 106 is routed to a hydrogen production system 114. In the hydrogen production system 114, the lights stream 106 can be used to produce a hydrogen product stream 116, for example, using a steam reforming system, a gasification system, or both. A water or steam stream 118 may be added to provide make up water for water shift reactions. In a steam reforming process, the hydrocarbons are contacted with the steam at about 700° C. to about 1000° C., for example, in a steam reforming reactor, over a nickel catalyst, producing $H_2$, CO, and $CO_2$. In a second vessel, such as a separation vessel, the CO is reacted with more steam to form $H_2$ and $CO_2$ in a water shift reaction.

In a gasification process, the hydrocarbons from the lights stream 106 are also converted into $H_2$, CO, and $CO_2$. In gasification, the hydrocarbons are reacted with a controlled amount of oxygen, steam, or both at greater than about 700° C., for example, without combustion, in a gasification reactor. The process is exothermic, allowing heat to be generated for use in other portions of the process. In a second vessel, such as a separation vessel, the CO may be reacted with more steam to form $H_2$ and $CO_2$ in a water shift reaction.

In embodiments in which the hydrogen production system 114 includes both a steam reforming and a gasification system, the separation sections and water shift systems may be integrated. The integration of the systems can be achieved using a membrane reformer in which hydrogen selective membranes are used in conjunction with a reforming catalyst, such as a nickel catalyst or a combination catalyst with nickel and a noble metal, such rhodium and gold, among others. Commercial steam reforming catalysts may be used. This will allow combining reforming, water-gas shift operations allowing process intensification of the hydrogen production process. As used herein, a water gas shift reaction is the reaction of carbon monoxide (CO) and water to form $CO_2$ and hydrogen. The water gas shift reaction may use a low temperature water-gas shift catalyst based on Cu—Zn or a high temperature water gas shift catalyst based on Fe.

As used herein, process intensification is the combination of multiple process to increase the efficiency and improve the economics of the overall process. In embodiments described herein, process intensification may be achieved through a combination of steam reforming, water gas shift and hydrogen separation or purification, which is generally conducted in a pressure swing adsorption system in conventional hydrogen production process. In some embodiments, a membrane reactor integrates these processes in a single reactor by integration of a high temperature hydrogen selective membrane, such as palladium alloy membranes. The membrane separates the produced hydrogen from the reaction environment, which overcomes the thermodynamic equilibrium for the reforming reaction. At the same time $CO_2$ and hydrogen are separated in the reactor. For example, $CO_2$ is removed on a higher pressure side and hydrogen on a lower pressure side of the membrane reactor.

In some embodiments, the hydrogen product stream 116 may be used as the source of the hydrogen stream 112 provided to the hydroprocessing system 110.

In embodiments in which the hydrogen production system 114 includes a gasification process, the gas generated in the gasifier may be water shifted in a membrane reactor that can operate at about 250° C. to about 300° C. with a hydrogen selective membrane and a water-gas shift catalyst integrated in the membrane reactor, such as a nickel catalyst. This also allows for the separation of $CO_2$, formed in-situ, which is removed as a $CO_2$ stream 120. For a conventional reforming or gasification process configurations a pressure swing adsorption (PSA) system may be included in the hydrogen production system 114 for the purification of hydrogen, including the raw hydrogen stream 126 produced in the steam cracking system 128 and separated in the products separation system 130. The raw hydrogen stream 126 includes hydrogen and methane and is sourced from a demethanizer inside the products separation system 130. In some embodiments, a renewable hydrogen stream 127 is combined with the raw hydrogen stream 126. As used herein, the renewable hydrogen stream 127 includes hydrogen obtained from renewable energy sources, such as hydrogen produced by electrolysis using electricity generated by a solar energy plant, a wind energy plant, a geothermal energy plant, or a biomass reactor, among others.

The raw hydrogen stream 126 is routed to the PSA system in the hydrogen production system 114. The PSA system may include two columns filled with a zeolite absorbent, one active column and one regenerating column. The hydrogen streams are combined and flowed through the active column, which absorbs impurities from the hydrogen flow. In embodiments, the purity of the hydrogen in the hydrogen product stream 116 is greater than about 80 vol. %, greater than about 90 vol. %, greater than about 95 vol. %, or higher.

The $CO_2$ stream 120 is routed to a $CO_2$ conversion system 122 for conversion of the $CO_2$ to synthetic hydrocarbons or other useful products. The conversion may be performed through hydrogenation or through further reforming in dry or wet conditions with lighter hydrocarbons. If wet conditions are used, a steam stream 124 may be added. It may be understood that the CO formed in the hydrogen production system 114 may be routed to the $CO_2$ conversion system 122 along with, or instead of, the $CO_2$. The $CO_2$ conversion reaction may include a steam reaction to convert $CO_2$ to $H_2$ and CO, if needed. The feedstocks may then be fed to a Fischer-Tropsch reactor to convert the hydrogen and carbon monoxide to hydrocarbons. In the Fischer-Tropsch reactor, the $H_2$ and CO are flowed over a catalyst at a temperature of about 150° C. to about 300° C. Lower temperatures favor higher carbon numbers. The catalyst may be a cobalt-based catalyst, an iron-based catalyst, a ruthenium-based catalyst, or a combination.

In some embodiments, the $CO_2$ conversion system 122 may produce a product stream 132 that includes methane or syngas as furnace fuel for other systems, such as the hydroprocessing system 110 or the steam cracking system 128, among others. In some embodiments, the product stream 132 is used as a make-up stream for a sales gas pipeline. In some embodiments, the product stream 132 is used as a feedstock for a number of chemicals or synthetic fuels streams. In some embodiments, the $CO_2$ may be hydrogenated using hydrogen from the hydrogen product stream 116, for example, forming dimethyl ether (DME), methanol, or other oxygenated compounds as part of the product stream 132. The use of renewable hydrogen in this process lowers the amount of $CO_2$ that may be produced in the processing facility.

The cut point, or separation temperature, between the lights stream 106 and the heavies stream 108 is adjusted based on economic and technical considerations. In some embodiments, the cut point may be set to about 180° C., about 220° C., or about 370° C. As described herein, the lights stream 106 is expected to be the main feed to the hydrogen production system 114. Accordingly, the cut point may be adjusted based on the need for hydrogen, among other parameters, such as composition and feedstock variations.

As described herein, the hydroprocessing system 110 processes the heavies stream 108 with hydrogen from the hydrogen stream 112. The hydrogen stream 112 can be either imported to the hydroprocessing system 110, for example, being produced in other systems, or may be sourced from the hydrogen product stream 116 produced in the hydrogen production system 114. The hydrogen may be added at 0.01 mol %, 0.1 mol %, 0.5 mol %, 1 mol %, 5 mol %, or higher, as a proportion of the heavies stream 108. This may improve products from the steam cracking system 128 as steam cracking of materials having higher hydrogen contents results in better products. Further, removing polynuclear aromatics decreases the coking tendency in the steam cracker coils. The hydroprocessing system 110 also increases the amount of feed available to the steam cracking system 128 via conversion of heavy hydrocarbon components into lighter hydrocarbons.

The hydroprocessing system 110 can carry out one or more of the following processes, generally in separate zones, hydrodemetallization, hydrodearomatization, hydrodenitrogenation, hydrodesulfurization, and hydrocracking. The hydroprocessing system 110 can include one or more beds containing an effective amount of hydrodemetallization catalyst. The hydroprocessing system 110 can include one or more beds containing an effective amount of hydroprocessing catalyst having one or more of hydrodearomatization, hydrodenitrogenation, hydrodesulfurization, and hydrocracking functions. In some examples, the hydroprocessing system 110 can include multiple catalyst beds, such as two, three, four, five, or another number of catalyst beds. In some examples, the hydroprocessing system 110 can include multiple reaction vessels each containing one or more catalyst beds of the same or different function.

The hydroprocessing system 110 can operate at a temperature between about 300° C. and about 450° C., such as about 300° C., about 350° C., about 400° C., about 450° C., or another temperature. The hydroprocessing system 110 can operate at a pressure between about 30 bar and about 180 bar, such as about 30 bar, about 60 bar, about 90 bar, about 120 bar, about 150 bar, about 180 bar, or another pressure. The hydroprocessing system 110 can operate with a liquid hour space velocity between about 0.1 h$^{-1}$ and about 10 h$^{-1}$, such as about 0.1 h$^{-1}$, about 0.5 h$^{-1}$, about 1 h$^{-1}$, about 2 h$^{-1}$, about 4 h$^{-1}$, about 6 h$^{-1}$, about 8 h$^{-1}$, about 10 h$^{-1}$, or another liquid hour space velocity. The liquid hour space velocity is the ratio of the flow rate of a reactant liquid through a reactor to the volume of the reactor. The products from the hydroprocessing system 110 include a hydroprocessor effluent 134 and a light hydrocarbon stream 136. The light hydrocarbon stream 136, for example, including materials with carbon numbers of $C_1$-$C_5$, is provided to the products separation system 130 for further separation and processing.

The hydroprocessor effluent 134, for example, including materials with carbon numbers of $C_5$ plus, is output from the hydroprocessing system 110 and directed to a hydroprocessor separation system 138, such as a high pressure cold or hot separator. In some examples, the hydroprocessor effluent 134 can be cooled in a heat exchanger (not shown) prior to the hydroprocessor separation system 138. The hydroprocessor separation system 138 separates the hydroprocessor effluent 134 into a separator tops stream 140, which are generally lower carbon number liquids, such as $C_8$ and below, with boiling point up to about 180° C., and separator bottoms stream 142, which have boiling points greater than about 180° C., such as materials with carbon numbers of $C_{10}$ and above. In some embodiments, the hydroprocessor separation system 138 is a flash separation device such as a flash drum, followed by a heat exchanger or condenser. In some embodiments, the hydroprocessor separation system 138 operates in the absence of a flash zone. In these embodiments, the hydroprocessor separation system 138 can include a cyclonic phase separation device, a splitter, or another type of separation device based on physical or mechanical separation of vapors and liquids. As for a flash separation device, these devices may be followed by a heat exchanger or condenser to condense the separator tops stream 140.

The separator tops stream 140 is routed to the steam cracking system 128. The steam cracking system 128 is a combination of gas and liquid furnaces. A steam stream 118 may be provided to one or more of the furnaces of the steam cracking system 128. The furnaces can be flexible or customized for some of the feed sent to the steam cracking system 128. The flow through the steam cracking furnaces of the steam cracking system 128 may provide a total exposure time of about 1 millisecond (ms), about 2 ms, about 5 ms, or about 10 ms. A quench tower may be provided immediately after the steam cracking furnace to cool the effluent from the steam cracking furnace and stop further reactions from taking place. A recycle stream 144 provided from the products separation system 130 may be used as a secondary feed. The recycle stream 144 generally includes fully saturated hydrocarbons having low carbon numbers, such as ethane and propane. Accordingly, the recycle stream 144 can be provided to the hydrogen production system 114 or to the steam cracking system 128, for example, depending on the economics of hydrogen production or chemicals production. A steam cracker product stream 146 is provided from the steam cracking system 128 to the products separation system 130. The steam cracker product stream 146 may include low carbon number compounds, such as ethylene, propylene, butenes, butadiene, as well as aromatic compounds, such as benzene, toluene, and xylene.

The separator tops stream 140 from the hydroprocessor separation system 138 includes hydrocarbon that was previously desulfurized and treated by the hydroprocessing system 110. For instance, the separator tops stream 140 can include naphtha. The separator tops stream 140 can include hydrocarbon having an initial boiling point and a final boiling point of between about 150° C. and about 230° C., such as about 150° C., about 160° C., about 170° C., about 180° C., about 190° C., about 200° C., about 210° C., about 220° C., about 230° C., or another temperature.

The separator bottoms stream 142, which contain the heavy bottoms of the hydroprocessor effluent 134, contain a reduced content of contaminants, such as metals, sulfur, or nitrogen, an increased paraffinicity, a reduced BMCI (Bureau of Mines Correlation Index), and an increased API (American Petroleum Institute) gravity as compared to the heavies stream 108 of crude oil input into the hydroprocessing system 110. In some examples, the hydroprocessor separation system 138 can be a flash separation device such as a flash drum. In some examples, the hydroprocessor separation system 138 can operate in the absence of a flash zone. For instance, the hydroprocessor separation system 138 can include a cyclonic phase separation device, a splitter, or another type of separation device based on physical or mechanical separation of vapors and liquids. The hydroprocessor separation system 138 can include one or more separation devices that are able to fractionate a hydrocarbon cut similar to naphtha range and broader, such as a hydrocarbon cut that is rich in aromatic precursors.

The separator bottoms stream 142 are fed to a heavy oils conversion system 148. The separator bottoms stream 142 can include hydrocarbon having an initial boiling point between about 150° C. and about 230° C., such as about 150° C., about 160° C., about 170° C., about 180° C., about 190° C., about 200° C., about 210° C., about 220° C., about 230° C., or another temperature; and a final boiling point of 540° C. or higher. The initial and final boiling points of the separator tops stream 140, the separator bottoms stream 142, or both can depend on the type of the feedstock stream 102 input into the processing facility 100. The heavy oils conversion system 148 may also be fed a pyoil stream 150 from the products separation system 130. A hydrogen stream 112, which may be sourced from the hydrogen product stream 116 of the hydrogen production system 114, may be added to the heavy oils conversion system 148 for cracking and hydrogenation of the separator bottoms stream 142 and pyoil stream 150.

In this heavy oils conversion system 148, cracking, or hydrogenation, or both are used to lower the molecular weight of the feed streams, such as the separator bottoms stream 142 and the pyoil stream 150. The cracked product stream 152 is provided to the products separation system 130. Remaining heavy oils may be combined with a portion of the pyoil stream 150 form a fuel oil product stream 154.

The products separation system 130 includes all systems for producing the chemical products from the conversion process. In various embodiments, the products separation system 130 includes the quench columns, primary fractionation columns, compressor and sets of columns with allows the production of ethylene 156, propylene 158, mixed Cos 160, and BTX 162. As described herein, BTX refers to benzene, toluene, and xylene. The products separation system 130 further includes the high-distillation temperature (HDT) and aromatics separation section to treat the pygas and separate BTX from this stream. It also includes the selective hydrogenation systems to saturate the tri-olefins produced in the steam cracking furnaces. The products separation system 130 is fed by the light hydrocarbon stream 136 from the hydroprocessing system 110 that includes the $C_1$-$C_5$ hydrocarbons. It is also fed with the steam cracker product stream 146 from the steam cracking system 128, and the cracked product stream 152 from the heavy oil conversion system 148.

As described herein, the products separation system 130 produces the pyoil stream 150, which can be recycled to the heavy oil conversion system 148, or provided as a component of the fuel oil product stream 154. The fuel oil product stream 154 may also include the heavier hydrocarbons which cannot be converted in the hydrogen production system 114, the steam cracking system 128, or the heavy oil conversion system 148, or recycled to the hydroprocessing system 110. The fuel oil product stream 154 may also be a purge stream if a portion of the pyoil is recycled to the heavy oil conversion system 148. The fuel oil product stream 154 is expected to be a low sulfur, low viscosity, and high density fuel oil. As used herein, high density fuel oil may have a density between about 750 and about 950 $kg/m^3$. The conditioning provided in the hydroprocessing system 110 will remove sulfur, providing a sulfur content of less than about 5 wt. %, less than about 3.5 wt. %, or less than about 2 wt. %, or lower. The aromaticity of the fuel oil product stream 154 will provide a viscosity of less than about 200 centistokes (cSt), less than about 180 cSt, less than about 150 cSt, or lower. The high density results from the high aromaticity of the pyoil formed in the steam cracking system 128. The economic value of this fuel oil may be adjusted by varying the streams used to form the fuel and by adjusting the operating conditions of the different systems.

Figure 2A:
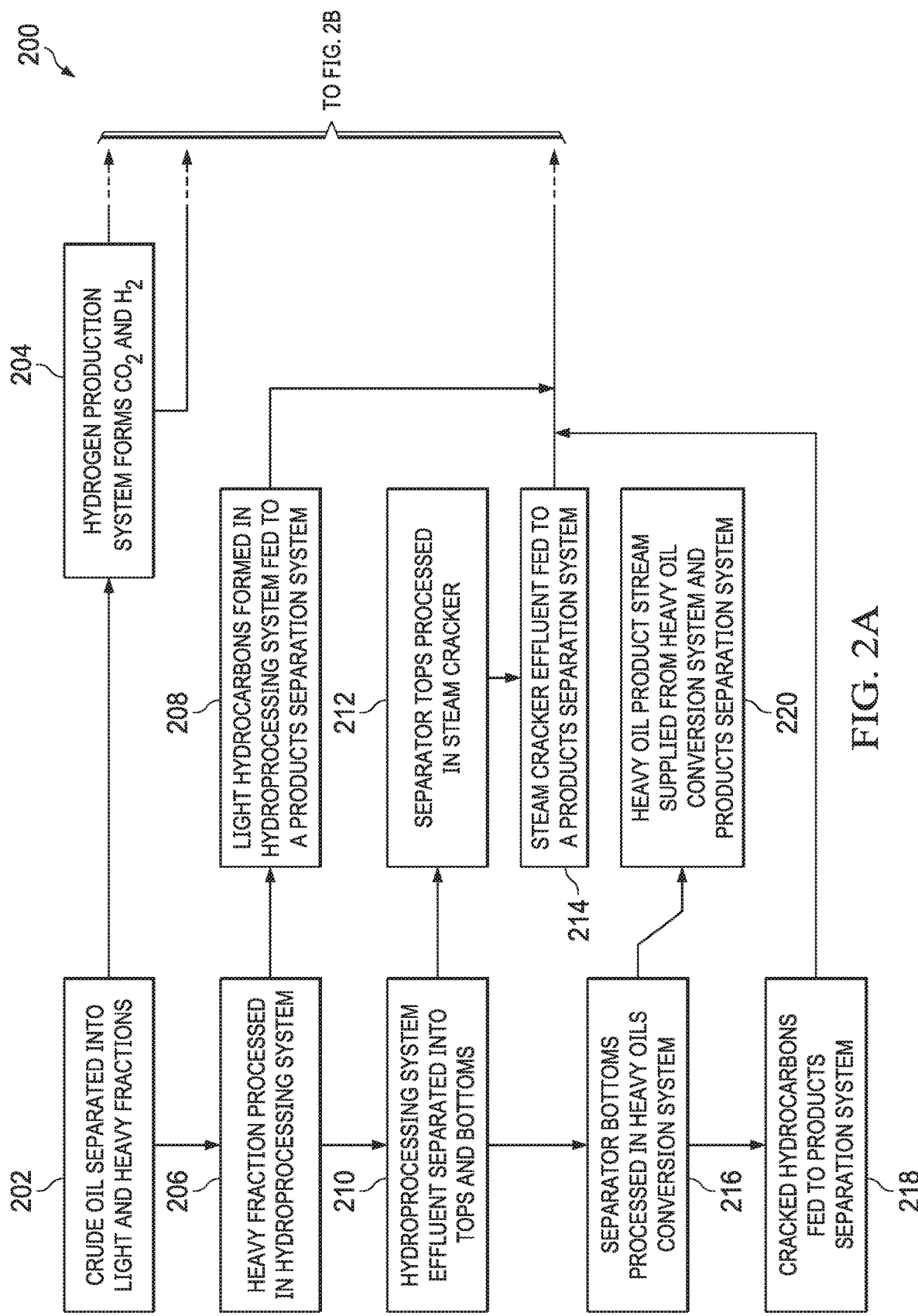
FIGS. 2A and 2B are flowcharts of a process for converting crude oil to petrochemicals.
Figure 2B:
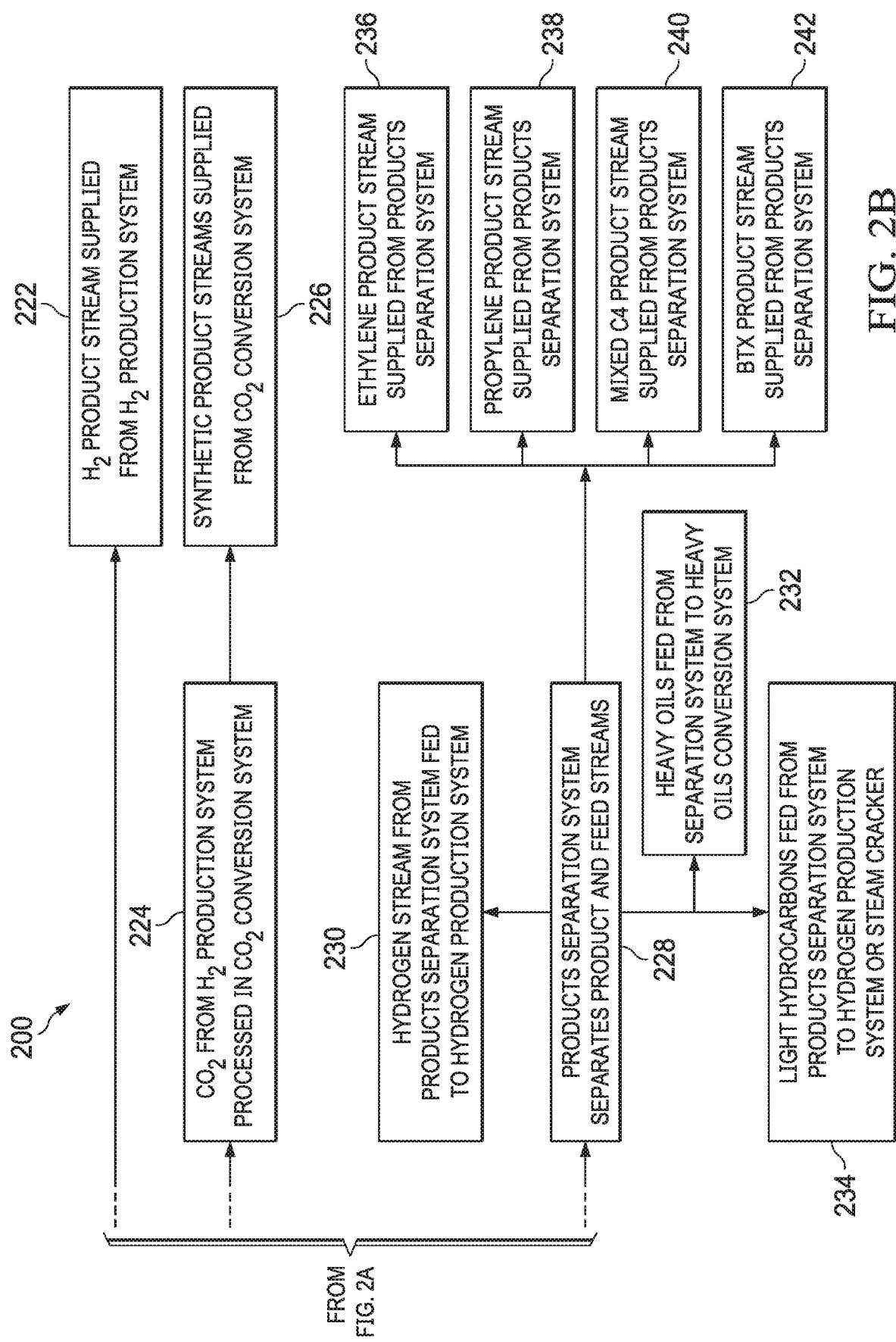

FIGS. 2A and 2B are flowcharts of a process 200 for converting crude oil to petrochemicals. The process begins at block 202, when a crude oil or condensate feed, is separated into a light fraction, such as a gas and a heavy fraction, such as a liquid. At block 204, the light fraction is processed to form hydrogen and carbon dioxide, for example, in a reforming process as described herein.

At block 206, the heavy fraction is processed in a hydroprocessing system for removal of impurities such as sulfur, metals, nitrogen, or other impurities, and for hydrocracking. At block 208, the light hydrocarbons from the hydroprocessing system, such as the $C_1$-$C_5$ hydrocarbon gases described herein, are sent to a products separation system.

At block 210, a hydroprocessed effluent from the hydroprocessing system is separated into a separator tops stream, which are generally gases, and a separator bottoms stream, which are substantially liquid. At block 212, the separator tops stream is processed in a steam cracker. At block 214, the steam cracker products are fed to the products separation system.

At block 216, the separator bottoms stream is processed in a heavy oils conversion system. At block 218, the cracked hydrocarbons from the heavy oils conversion system are fed to the products separation system. At block 220, an outlet stream from the heavy oils conversion system, the products separation system, or a combined outlet stream from both, may be used to provide a fuel oil product stream.

In FIG. 2B, at block 222, a hydrogen product stream is supplied from the hydrogen production system. Portions of the hydrogen product stream be used as a feedstock for the hydroprocessing system of block 206, the heavy oils conversion system of block 216, or the carbon dioxide conversion system of block 224. The carbon dioxide from the hydrogen production system of block 204 is processed in the carbon dioxide conversion system of block 224 to form synthetic fuels and other chemicals. At block 226, these are provided as synthetic product streams from the carbon dioxide, which may be used in downstream processes.

At block 228, the products separation system separates product and feed streams from the steam cracker products of block 214, the cracked hydrocarbons of block 218, and light hydrocarbons of block 208. At block 230, a hydrogen stream from the products separation system is fed to the hydrogen production system for further purification, for example, in a pressure swing adsorption (PSA) system incorporated into the hydrogen production system. A block 232, heavy oils are fed from the products separation system to the heavy oils conversion system. At least a portion of the heavy oils may be used as the fuel oil product stream of block 220. At block 234, light hydrocarbons may be fed from the products separation system to the hydrogen production system of block 204 or to the steam cracker of block 212. At block 236, an ethylene product stream is supplied from the products separation system. At block 238, a propylene product stream is supplied from the products separation system. At block 240, a mixed $C_4$ product stream is supplied from the products separation system. At block 242, a BTX product stream is supplied from the products separation system.

Depending on the components of the crude oil stream, or the economics of the process, the heavy oil conversion system may be omitted. For example, if a crude oil or condensate stream does not have a high content of high carbon number materials, such as a light crude, the heavy oil conversion system may not be needed. Further, if the economics of the process do not favor the fuel oil product stream, the heavy oil conversion system may be bypassed or eliminated. In some embodiments, the heavy oil conversion system is present, but configured to be bypassed.

Figure 3:
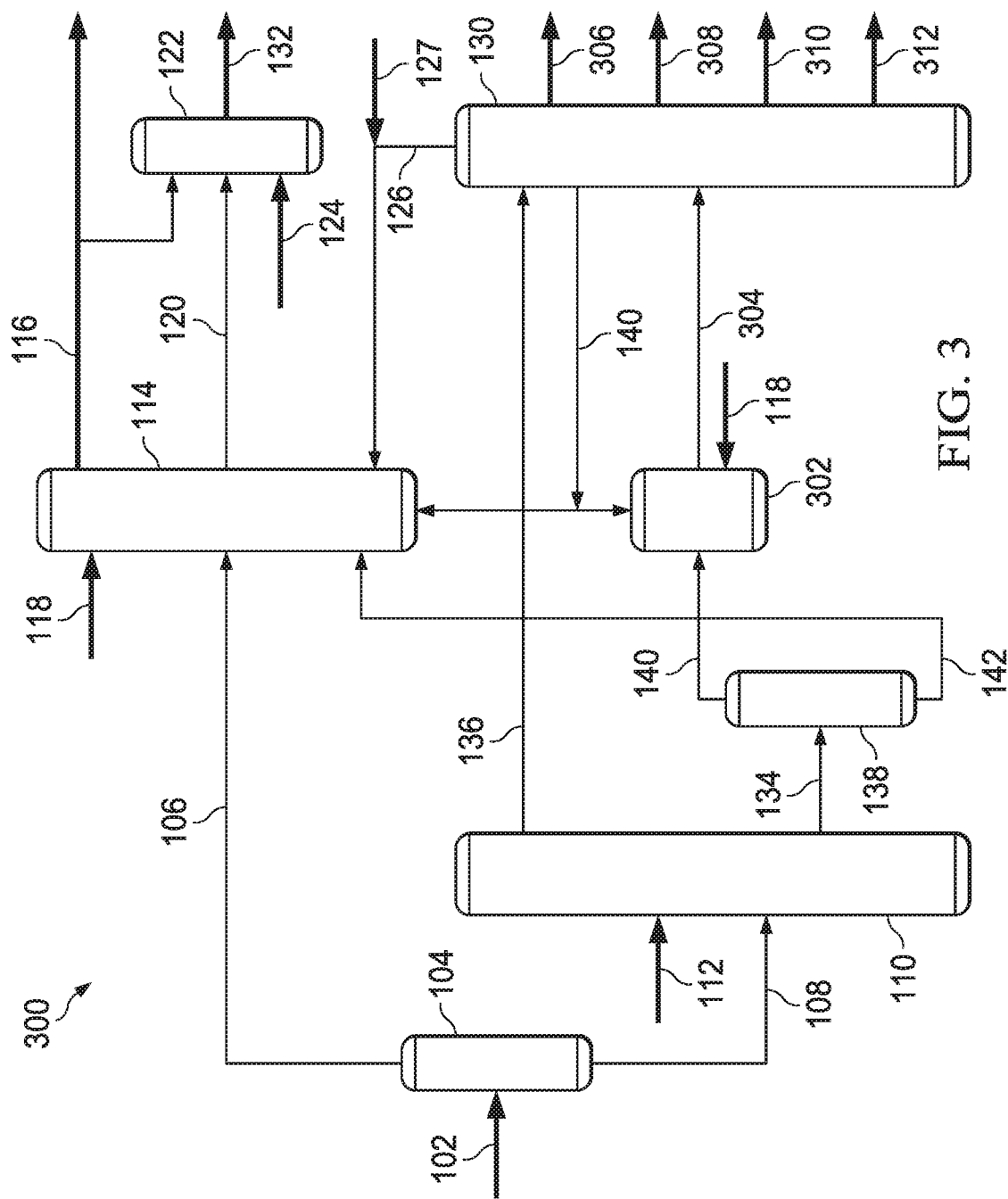
FIG. 3 is an example of a processing facility that directly processes a feedstock stream, such as crude oil or condensate, to form petrochemicals, including both olefinic and aromatic petrochemicals.

FIG. 3 is an example of a processing facility 300 that directly processes a feedstock stream 102, such as crude oil or condensate, to form petrochemicals, including both olefinic and aromatic petrochemicals. Like numbered items are as described with respect to FIG. 1. In this processing facility 300, the heavy oils conversion system 148 is omitted. Instead the separator bottoms stream 142 are sent to the hydrogen production system 114, and the separator tops stream 140 from the hydroprocessor separation system 138 is routed to a catalytic cracker or reformer 302, such as a naphtha reforming system. Because the separator tops stream 140 was treated in the hydroprocessing system 110 upstream of the reformer 302, no further hydrotreating of the separator tops stream 140 is performed before the separator tops stream 140 is fed into the reformer 302. The reformer 302 converts the separator tops stream 140 into a reformate that is rich in aromatics, such as benzene, toluene, and xylene (BTX). In some examples, the reformer 302 enables a high production of xylene at the expense of a lower production of benzene. The reformer 302 can also produce hydrocarbon byproducts such as hydrogen gas and light hydrocarbon gases. The purposeful generation of aromatics by treating the separator tops stream 140 in the reformer 302 enables the overall yield of aromatics from the processing facility 100 to be increased.

The reformer 302 includes one or more reactors such as a hydrocracking reactor, an isomerization reactor, a dehydrocyclization reactor, or a dehydrogenation reactor, or any combinations thereof, to convert the separator tops stream 140 into a reformate that is rich in aromatics, such as benzene, toluene, and xylene (BTX). The reformer 302 can also generate hydrocarbon byproducts, such as hydrogen and light hydrocarbon gases. The reformer 302 can include a catalyst that is compatible with catalytic processes that maximize production of aromatics. For example, the catalyst can be a mono- or bi-functional metal catalyst, including one or more of platinum, palladium, rhenium, tin, gallium, bismuth, or other metal catalysts. The catalyst may be a halogen containing catalyst, a catalyst employing a zeolite, such as zeolite L or a ZSM-5 zeolite, a catalyst employing a crystalline or amorphous support that is mesoporous or microporous, such as an alumina, silica, or alumina silica support, or another type of catalyst that can maximize aromatics production. Further, the catalysts may include hydroprocessing catalysts, as described herein.

The operating conditions of the reformer 302 can be selected to maximize aromatics production. The reformer 302 can operate at a pressure between about 0.01 bar and about 50 bar, such as about 0.01 bar, about 0.1 bar, about 0.5 bar, about 1 bar, about 5 bar, about 10 bar, about 20 bar, about 30 bar, about 40 bar, about 50 bar, or another pressure. The molar ratio of hydrogen to hydrocarbon in the reformer 302 can be between about 1:1 and about 10:1, such as about 1:1, about 2:1, about 4:1, about 6:1, about 8:1, about 10:1, or another ratio. The reformer 302 can operate at a temperature between about 400° C. and about 600° C., such as about 400° C., about 450° C., about 500° C., about 550° C., about 600° C., or another temperature. The reformer 302 can operate with a liquid hour space velocity between about 0.1 $h^{-1}$ and about 5 $h^{-1}$, such as about 0.1 $h^{-1}$, about 0.5 $h^{-1}$, about 1 $h^{-1}$, about 2 $h^{-1}$, about 3 $h^{-1}$, about 4 $h^{-1}$, about 5 $h^{-1}$, or another liquid hour space velocity.

In some embodiments, the products separation system 130 includes an aromatics extraction system to separate aromatics from reformate and pyrolysis gasoline using extraction techniques, such as solvent extraction, extractive distillation, or other extraction techniques. The aromatic extraction system receives the liquid stream 304 that includes the reformate from the products separation system 130, as well as other product streams generated herein, and produces aromatics product streams. In various embodiments, the aromatics product streams include a benzene product stream 306, a toluene product stream 308, and a xylene product stream 310. The pyrolysis gasoline, and other products from the reformer 302 and the light hydrocarbon stream 136 may be combined into a fuel oil product stream 312.

Figure 4A:
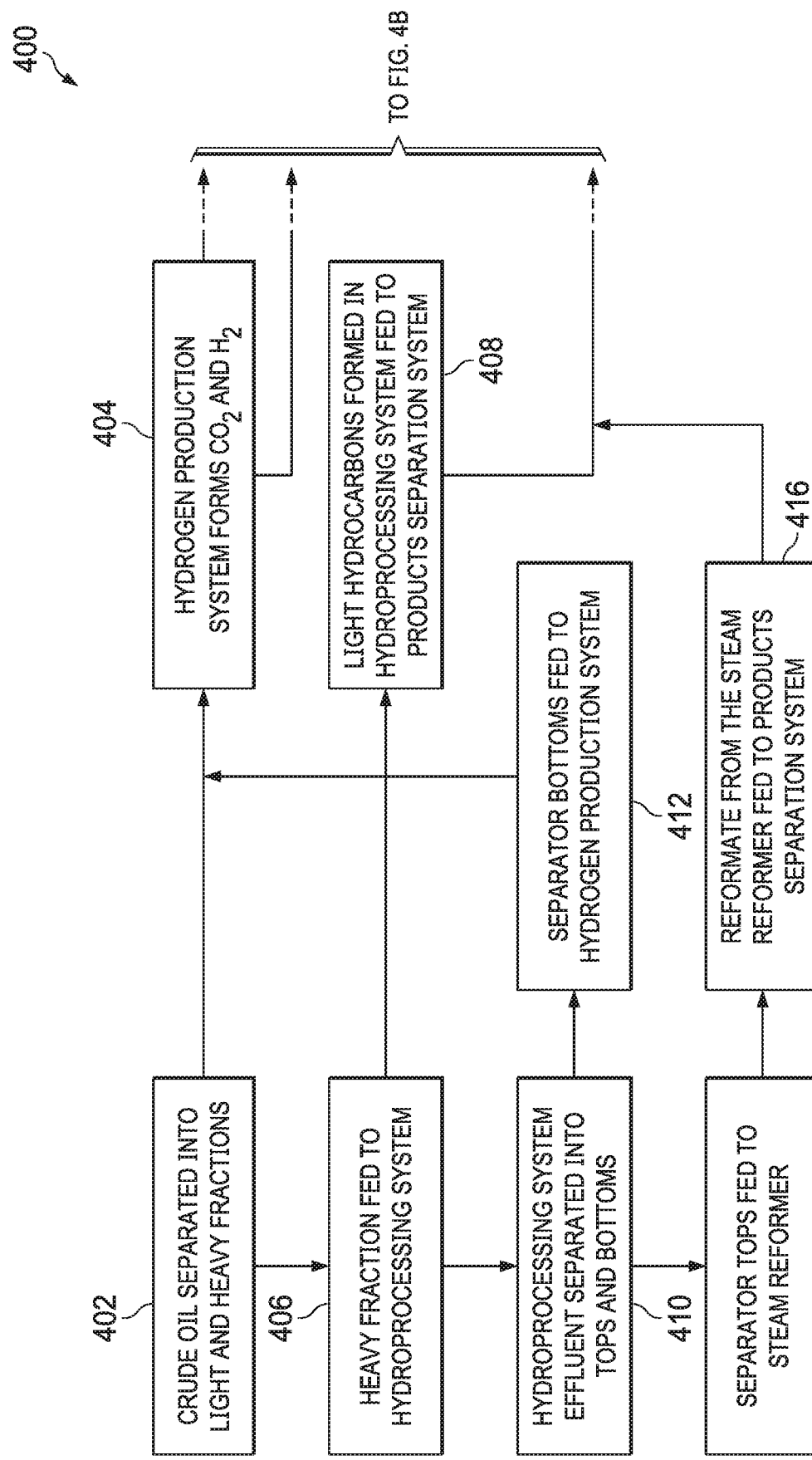
FIGS. 4A and 4B are flowcharts of a process for converting crude oil to petrochemicals.
Figure 4B:
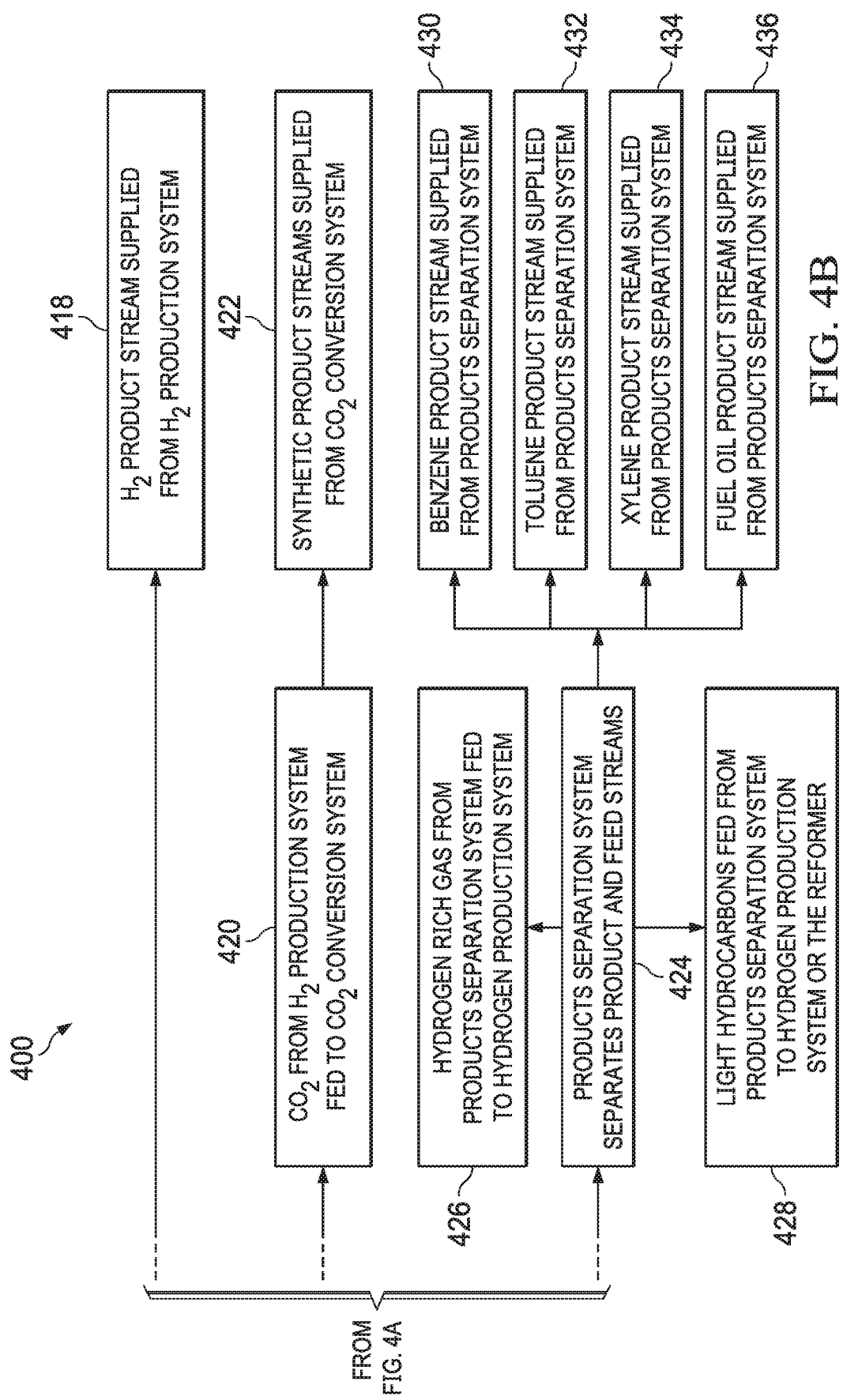

FIGS. 4A and 4B are flowcharts of a process 400 for converting crude oil to petrochemicals. The process begins at block 402, when a crude oil, or condensate feed, is separated into a light fraction, such as a gas and a heavy fraction, such as a liquid. At block 404, the light fraction is processed to form hydrogen and carbon dioxide, for example, in a reforming process, as described herein.

At block 406, the heavy fraction is processed in a hydroprocessing system for removal of impurities, such as sulfur, metals, nitrogen, or other impurities, and for hydrocracking. At block 408, the light hydrocarbons from the hydroprocessing system, such as the $C_1$-$C_5$ hydrocarbon gases described herein, are sent to a products separation system.

At block 410, a hydroprocessed effluent from the hydroprocessing zone is separated into separator tops stream, which are generally gases, and separator bottoms stream, which are substantially liquid. At block 412, the separator bottoms stream are passed to the hydrogen production system of block 404.

At block 414, the separator tops stream are processed in a steam reformer. At block 416, the reformate from the steam reformer is fed to the products separation system.

In FIG. 4B, at block 418, a hydrogen product stream is supplied from the hydrogen production system. Portions of the hydrogen product stream can be used as a feedstock for the hydroprocessing system of block 406, the steam reformer of block 414, or the carbon dioxide conversion system of block 420. The carbon dioxide from the hydrogen production system of block 406 is processed in the carbon dioxide conversion system of block 420 to form synthetic fuels and other chemicals. At block 422, these are provided as synthetic product streams from the carbon dioxide conversion system and may be used in downstream processes.

At block 424, the products separation system separates product streams from the steam reformer of block 414 and the hydroprocessing system of block 406. At block 426, a hydrogen stream from the products separation system is fed to the hydrogen production system for further purification, for example, in a pressure swing adsorption (PSA) system incorporated into the hydrogen production system. At block 428, light hydrocarbons may be fed from the separation system to the hydrogen production system of block 404 or to the steam reformer of block 414.

As described herein, the products separation system of block 424 may include an aromatics purification system. At block 430, a benzene product stream is supplied from the products separation system. At block 432, a toluene product stream is supplied from the products separation system. At block 434, a xylene product stream is supplied from the products separation system. At block 436, a fuel oil product stream is supplied from the products separation system.

An embodiment described in examples herein provides a processing facility. The processing facility includes a feedstock separation system configured to separate a feed stream into a lights stream and a heavies stream, a hydrogen production system configured to produce hydrogen and carbon dioxide from the lights stream, and a carbon dioxide conversion system configured to produce synthetic hydrocarbons or the carbon dioxide. The processing facility also includes a hydroprocessing system configured to process the heavies stream, and a hydroprocessor separation system configured to separate a hydroprocessing system effluent into a separator tops stream and a separator bottoms stream, wherein the separator bottoms stream is fed to the hydrogen production system.

In an aspect, the feed stream includes a crude oil. In an aspect, the feed stream includes a condensate.

In an aspect, the feedstock separation system includes a flash drum. In an aspect, the feedstock separation system includes a cyclonic phase separation device.

In an aspect, the hydrogen production system includes a steam reforming reactor. In an aspect, the hydrogen production system includes a gasification reactor. In an aspect, the hydrogen production system includes a pressure swing absorption system.

In an aspect, the carbon dioxide conversion system includes a Fischer-Tropsch reactor. In an aspect, the carbon dioxide conversion system includes a dry reforming process.

In an aspect, the hydroprocessing system includes a hydrodemetallization zone, a hydrodearomatization zone, a hydrodenitrogenation zone, a hydrodesulfurization zone, or a hydrocracking zone, or any combinations thereof.

In an aspect, the processing facility includes a reformer configured to process the separator tops stream. In an aspect, at least a portion of the hydrogen produced in the hydrogen production system is supplied to the reformer.

In an aspect, the hydroprocessor separation system includes a flash drum. In an aspect, the hydroprocessor separation system includes a cyclonic phase separation device. In an aspect, the reformer includes an isomerization reactor. In an aspect, the reformer includes a hydrocracking reactor. In an aspect, the reformer includes a dehydrocyclization reactor. In an aspect, the reformer includes a dehydrogenation reactor.

In an aspect, the processing facility includes a products separation system configured to separate product streams from the hydroprocessing system, the reformer, the heavy oil conversion system, or any combinations thereof. In an aspect, the products separation system is configured to provide a raw hydrogen stream to the hydrogen production system.

Another embodiment described in examples herein provides a method. The method includes separating a feedstock stream into a light fraction and a heavy fraction, processing the light fraction in a hydrogen production system to form hydrogen and carbon dioxide, processing the heavy fraction in a hydroprocessing system. A hydroprocessed effluent from the hydroprocessing system is separated into a separator tops stream and a separator bottoms stream. The separator tops stream are processed in a reformer, and the separator bottoms stream is fed to the hydrogen production system.

In an aspect, light hydrocarbons formed in the hydroprocessing system are fed to a products separation system. In an aspect, a hydrogen product stream is provided from the hydrogen production system. In an aspect, a hydrogen stream is provided to the hydroprocessing system from the hydrogen production system.

In an aspect, a steam reformer effluent is fed to a products separation system. In an aspect a fuel oil product stream is provided from a products separation system. In an aspect a light hydrocarbon stream is fed from a products separation system to the hydrogen production system. In an aspect a light hydrocarbon stream is fed from a products separation system to the steam cracker.

In an aspect, the carbon dioxide is processed in a carbon dioxide conversion system. In an aspect, a synthetic product stream is provided from the carbon dioxide conversion system. In an aspect, a raw hydrogen stream from a products separation system is sent to the hydrogen production system. In an aspect, the light hydrocarbon from a products separation system is fed to the hydrogen production system, the reformer, or both.

In an aspect, a products separation system is included that includes an aromatics extraction system. In an aspect, a benzene product stream is provided from the products separation system. In an aspect a toluene product stream is provided from the products separation system. In an aspect, a mixed $C_4$ product stream is provided from the products separation system.

Other implementations are also within the scope of the following claims.

What is claimed is:

1. A processing facility comprising:
a feedstock separation system configured to separate a crude oil stream into two streams, consisting of a lights stream and a heavies stream, wherein the feedstock separation system is a flash separator or a cyclonic separator;
a line coupling the feedstock separation system to a hydrogen production system to convey the lights stream to the hydrogen production system;
the hydrogen production system configured to produce hydrogen and carbon dioxide from the lights stream;
a carbon dioxide conversion system configured to produce synthetic hydrocarbons from the carbon dioxide;
a hydroprocessing system configured to process the heavies stream; and
a hydroprocessor separation system configured to separate a hydroprocessing system effluent into a separator tops stream and a separator bottoms stream, wherein the separator bottoms stream is fed to the hydrogen production system.

2. The processing facility of claim 1, wherein the feed stream comprises a crude oil.

3. The processing facility of claim 1, wherein the feed stream comprises a condensate.

4. The processing facility of claim 1, wherein the feedstock separation system comprises a flash drum.

5. The processing facility of claim 1, wherein the feedstock separation system comprises a cyclonic phase separation device.

6. The processing facility of claim 1, wherein the hydrogen production system comprises a steam reforming reactor.

7. The processing facility of claim 1, wherein the hydrogen production system comprises a gasification reactor.

8. The processing facility of claim 1, wherein the hydrogen production system comprises a pressure swing absorption system.

9. The processing facility of claim 1, wherein the carbon dioxide conversion system comprises a Fischer-Tropsch reactor.

10. The processing facility of claim 1, wherein the carbon dioxide conversion system comprises a dry reforming reactor.

11. The processing facility of claim 1, wherein the hydroprocessing system comprises a hydrodemetallization zone, a hydrodearomatization zone, a hydrodenitrogenation zone, a hydrodesulfurization zone, or a hydrocracking zone, or any combinations thereof.

12. The processing facility of claim 1, comprising a reformer configured to process the separator tops stream.

13. The processing facility of claim 12, wherein at least a portion of the hydrogen produced in the hydrogen production system is supplied to the reformer.

14. The processing facility of claim 12, wherein the hydroprocessor separation system comprises a flash drum.

15. The processing facility of claim 12, wherein the hydroprocessor separation system comprises a cyclonic phase separation device.

16. The processing facility of claim 12, wherein the reformer comprises an isomerization reactor.

17. The processing facility of claim 12, wherein the reformer comprises a hydrocracking reactor.

18. The processing facility of claim 12, wherein the reformer comprises a dehydrocyclization reactor.

19. The processing facility of claim 12, wherein the reformer comprises a dehydrogenation reactor.

20. The processing facility of claim 12, comprising a products separation system configured to separate product streams from the hydroprocessing system, the reformer, the heavy oil conversion system, or any combinations thereof.

21. The processing facility of claim 20, wherein the products separation system is configured to provide a raw hydrogen stream to the hydrogen production system.

22. A method, comprising:
separating a crude oil stream into two fractions in a flash separator or a cyclonic separator, wherein the two fractions consist of a light fraction and a heavy fraction;
feeding the light fraction directly to a hydrogen production system;
processing the light fraction in the hydrogen production system to form hydrogen and carbon dioxide;
processing the heavy fraction in a hydroprocessing system;

separating a hydroprocessed effluent from the hydroprocessing system into a separator tops stream and a separator bottoms stream;
processing the separator tops stream in a reformer; and
feeding the separator bottoms stream to the hydrogen production system.

23. The method of claim 22, comprising feeding light hydrocarbons formed in the hydroprocessing system to a products separation system.

24. The method of claim 22, comprising providing a hydrogen product stream from the hydrogen production system.

25. The method of claim 22, comprising providing a hydrogen stream to the hydroprocessing system from the hydrogen production system.

26. The method of claim 22, comprising feeding a steam reformer effluent to a products separation system.

27. The method of claim 22, comprising providing a fuel oil product stream from a products separation system.

28. The method of claim 22, comprising feeding a light hydrocarbon stream from a products separation system to the hydrogen production system.

29. The method of claim 22, comprising feeding a light hydrocarbon stream from a products separation system to the steam cracker.

30. The method of claim 22, comprising processing the carbon dioxide in a carbon dioxide conversion system.

31. The method of claim 30, comprising providing a synthetic product stream from the carbon dioxide conversion system.

32. The method of claim 22, comprising sending a raw hydrogen stream from a products separation system to the hydrogen production system.

33. The method of claim 22, comprising feeding a light hydrocarbon from a products separation system to the hydrogen production system, the reformer, or both.

34. The method of claim 22, comprising a products separation system comprising an aromatics extraction system.

35. The method of claim 34, comprising providing a benzene product stream from the products separation system.

36. The method of claim 34, comprising providing a toluene product stream from the products separation system.

37. The method of claim 34, comprising providing a mixed C4 product stream from the products separation system.

* * * * *

UNITED STATES PATENT AND TRADEMARK OFFICE
CERTIFICATE OF CORRECTION

PATENT NO. : 11,572,517 B2
APPLICATION NO. : 16/701796
DATED : February 7, 2023
INVENTOR(S) : Aadesh Harale et al.

It is certified that error appears in the above-identified patent and that said Letters Patent is hereby corrected as shown below:

On the Title Page

Item (56) in Column 2, Line 3, please replace "97MC28133" with -- 92MC28133 --.

Signed and Sealed this
Eighteenth Day of April, 2023

Katherine Kelly Vidal
*Director of the United States Patent and Trademark Office*